United States Patent
Wei et al.

(10) Patent No.: US 11,250,276 B2
(45) Date of Patent: Feb. 15, 2022

(54) OBJECT HEIGHT DETERMINATION FOR AUTOMATED VEHICLE STEERING CONTROL SYSTEM

(71) Applicant: Motional AD LLC, Boston, MA (US)

(72) Inventors: Junqing Wei, Bridgeville, PA (US); Wenda Xu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/526,854

(22) Filed: Jul. 30, 2019

(65) Prior Publication Data

US 2019/0354784 A1    Nov. 21, 2019

Related U.S. Application Data

(63) Continuation of application No. 15/653,846, filed on Jul. 19, 2017, now Pat. No. 10,417,508.

(51) Int. Cl.
| | |
|---|---|
| *B62D 1/00* | (2006.01) |
| *B62D 6/00* | (2006.01) |
| *B62D 15/00* | (2006.01) |
| *B60W 30/02* | (2012.01) |
| *B60W 30/08* | (2012.01) |

(Continued)

(52) U.S. Cl.
CPC ......... *G06K 9/00805* (2013.01); *B60W 30/09* (2013.01); *B62D 15/0265* (2013.01); *G08G 1/166* (2013.01)

(58) Field of Classification Search
CPC .. G06K 9/00; G06K 9/00805; B62D 15/0265; B62D 6/00; B62D 6/0265; B62D 1/00; B62D 15/00; G08G 1/16; G08G 1/166; B60W 2554/00; B60W 30/00; B60W 30/06; B60W 30/08; B60W 30/09; B60W 30/02

See application file for complete search history.

(56) References Cited

U.S. PATENT DOCUMENTS 7,202,776 B2 *  4/2007  Breed ..................... G01S 19/42
                                                    340/435
9,494,093 B2 * 11/2016  Crombez .................. G01L 5/22
(Continued)

FOREIGN PATENT DOCUMENTS

| CN | 103733028 | 4/2014 |
|---|---|---|
| CN | 104554104 | 4/2015 |

(Continued)

OTHER PUBLICATIONS

EP Extended Search Report in European Application No. 20158465. 3, dated Jun. 10, 2020, 11 pages.

(Continued)

*Primary Examiner* — Yonel Beaulieu
(74) *Attorney, Agent, or Firm* — Fish & Richardson P.C.

(57) ABSTRACT

A steering-system for an automated vehicle is provided. The system includes an object-detector and a controller. The object-detector indicates a height and/or a width of an object approached by a host-vehicle. The controller is configured to steer the host-vehicle and is in communication with the object-detector. The controller steers the host-vehicle to straddle the object when the height of the object is less than a ground-clearance of the host-vehicle, and/or the width of the object is less than a track-width of the host-vehicle.

20 Claims, 2 Drawing Sheets

(51) Int. Cl.
    *B60W 30/09*     (2012.01)
    *G08G 1/16*     (2006.01)
    *G06K 9/00*     (2022.01)
    *B62D 15/02*     (2006.01)

(56) References Cited

U.S. PATENT DOCUMENTS

| | | | |
|---|---|---|---|
| 10,417,508 B2 * | 9/2019 | Wei | B62D 15/0265 |
| 2005/0134440 A1 * | 6/2005 | Breed | G01S 17/89 |
| | | | 340/435 |
| 2013/0321627 A1 * | 12/2013 | Turn, Jr. | G06K 9/00798 |
| | | | 348/148 |
| 2014/0330483 A1 * | 11/2014 | Lu | B60G 17/02 |
| | | | 701/37 |
| 2015/0210274 A1 * | 7/2015 | Clarke | G08G 1/167 |
| | | | 382/104 |
| 2016/0102622 A1 * | 4/2016 | Crombez | G01L 5/22 |
| | | | 701/51 |
| 2016/0339959 A1 * | 11/2016 | Lee | G06K 9/00798 |
| 2017/0057502 A1 | 3/2017 | Pandita et al. | |
| 2017/0349023 A1 * | 12/2017 | Mori | B60G 17/016 |
| 2018/0118213 A1 * | 5/2018 | Stoffels | B60W 50/14 |
| 2019/0026570 A1 | 1/2019 | Wei et al. | |

FOREIGN PATENT DOCUMENTS

| | | |
|---|---|---|
| CN | 106167045 | 11/2016 |
| DE | 102011115353 | 4/2012 |
| EP | 2883769 | 6/2015 |
| EP | 3103695 | 12/2016 |
| JP | H0523736 | 3/1993 |
| WO | WO 2014148978 | 9/2014 |
| WO | WO 2016158238 | 10/2016 |

OTHER PUBLICATIONS

EP Extended Search Report in European Application No. 18184400, dated Dec. 20, 2018, 10 pages.
CN Office Action in Chinese Appln. No. 2018107969308, dated Oct. 20, 2021 35 pages (with English translation).
Wang, et al., "Simulation Research on Obstacle Avoidance Control of Two-wheeled Trolley", Jun Wang et al. Proceedings of China Control and Decision Academic Annual Conference, Apr. 1999. 621, 5 pages.

* cited by examiner

OBJECT HEIGHT DETERMINATION FOR AUTOMATED VEHICLE STEERING CONTROL SYSTEM

CROSS-REFERENCE TO RELATED APPLICATION

This application is a continuation of and claims priority to U.S. patent application Ser. No. 15/653,846, filed Jul. 19, 2017, issued on Sep. 17, 2019 as U.S. Pat. No. 10,417,508, the entire contents of which are incorporated herein by reference.

TECHNICAL FIELD OF INVENTION

This disclosure generally relates to a steering-system for an automated vehicle, and more particularly relates to a system that steers a host-vehicle to straddle the object when the height of the object is less than a ground-clearance of the host-vehicle and/or the width of the object is less than a track-width of the host-vehicle.

BACKGROUND OF INVENTION

It has been observed that an automated vehicle may unnecessarily drive around object that is actually low enough to drive over, i.e. straddle.

SUMMARY OF THE INVENTION

In accordance with one embodiment, a steering-system for an automated vehicle is provided. The system includes an object-detector and a controller. The object-detector indicates a height and/or a width of an object approached by a host-vehicle. The controller is configured to steer the host-vehicle and is in communication with the object-detector. The controller steers the host-vehicle to straddle the object when the height of the object is less than a ground-clearance of the host-vehicle, and/or the width of the object is less than a track-width of the host-vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
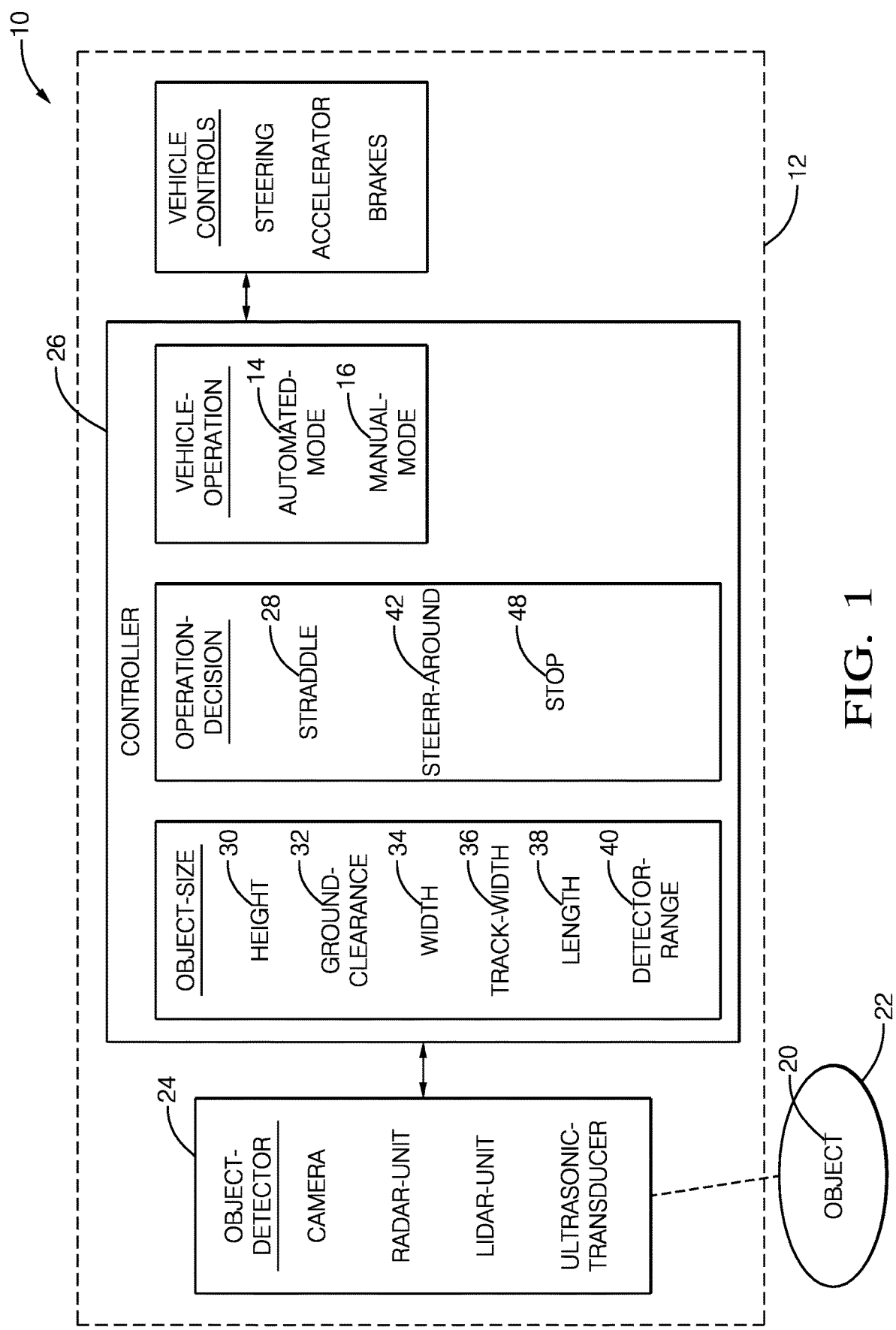
FIG. 1 is a diagram of a steering-system for a host-vehicle in accordance with one embodiment.

FIG. 1 illustrates a non-limiting example of a steering-system 10, hereafter referred to as the system 10, which is suitable for use on an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid a collision with, for example, an object 20 in the travel-path 22 (FIG. 2) of the host-vehicle 12.

The system 10 includes an object-detector 24 that may be formed of, but not limited to, a camera, a lidar, a radar, an ultrasonic-transducer, or any combination thereof. While FIG. 1 may be interpreted to suggest that the devices that form the object-detector 24 are co-located in a unified assembly, this is not a requirement. It is contemplated that the various devices may be mounted at distributed locations on the host-vehicle 12. Indeed, it is recognized that different types of devices provide more useful information about the object 20 when placed at different locations on the host-vehicle 12, as will become apparent in the description of the system 10 that follows.

The system 10 includes a controller 26 configured to operate the host-vehicle 12 using vehicle-controls to steer, brake, and/or accelerate the host-vehicle 12. The means by which the controller 26 is able to control the steering, accelerator, and brakes of the host-vehicle 12 are well-known to those in the art. The controller 26 is in communication with the object-detector 24. The communication may be by way of wires, optical-cable, a data-buss, or wireless communications, as will be recognized by those in the art. The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining how to operate the host-vehicle 12 with respect to the object 20 based on signals received by the controller 26 from the object-detector 24 as described herein.

Figure 2:
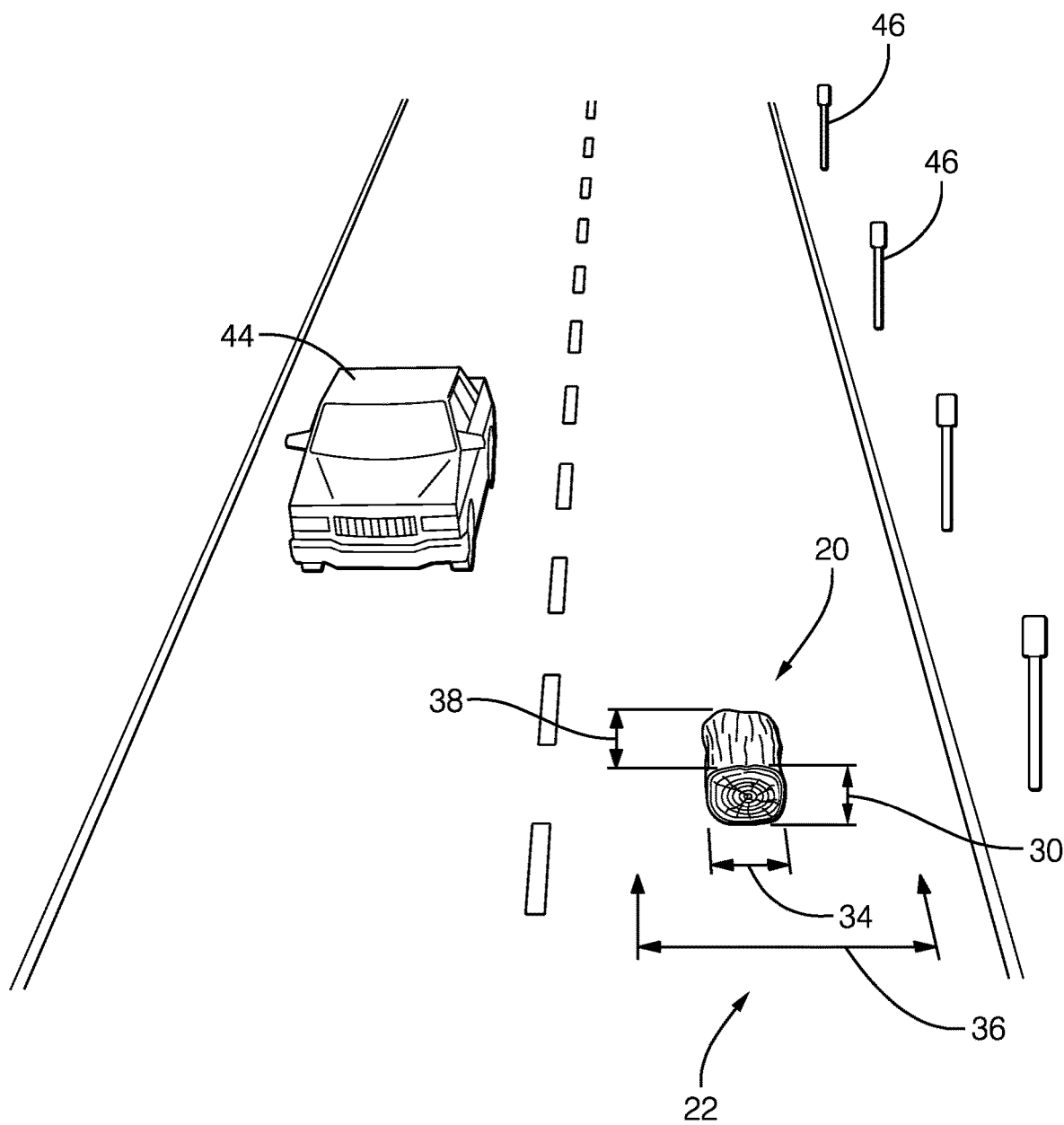
FIG. 2 is a perspective view of an object approached by the host-vehicle equipped with the system of FIG. 1 in accordance with one embodiment.

FIG. 2 illustrates a non-limiting example of an object 20 present in a travel-path 22 of the host-vehicle 12 (not shown in FIG. 2). In this non-limiting example, the object is a partial-section of a log that may have fallen from a logging-truck. As mentioned previously, it has been observed that automated-vehicles may unnecessarily avoid an object that is small enough to straddle 28 (FIG. 1). As used herein, to straddle the object 20 means that the host-vehicle drives over the object 20 in a manner such that the effect is that the object 20 passes between the wheels (not shown) of the host-vehicle 12, and preferably does not make contact with the undercarriage of the host-vehicle 12. That is, the controller 26 steers the host-vehicle 12 to straddle 28 the object 20 when a height 30 of the object 20 is less than a ground-clearance 32 of the host-vehicle 12 and/or a width 34 of the object 20 is less than a track-width 36 (i.e. lateral distance between tires) of the host-vehicle 12.

The object-detector 24 may be particularly configured to indicate the height 30 of the object 20 approached by a host-vehicle 12. For example, the object-detector 24 may include a lidar and/or a camera mounted at a relatively low location on the host-vehicle 12, at bumper-height for example. From this location, data from the lidar and/or images from the camera can be readily used by the controller 26 determine if the height 30 of the object 20 is greater than or less than the ground-clearance 32 of the host-vehicle 12. However, a relatively low location is not a requirement as those in the art will recognize that data/images from various devices mounted at a relatively high position can be fused and analyzed using known geometry techniques that consider distance from the host-vehicle 12 to the object 20 to determine the height 30 of the object 20.

Alternatively, one or more instance of ultrasonic-transducers may also be mounted on the front bumper of the host-vehicle and oriented to 'look-down' towards the surface of the travel-path 22. While this configuration may not provide much in the way of advance warning, it may be helpful to determine if the host-vehicle 12 can straddle the object 20 when the height 30 of the object 20 is very close to the ground-clearance 32 of the host-vehicle 12.

It is recognized that the ground-clearance 32 is not necessarily a fixed value for the entire area that is inside of the track-width 36. Accordingly, the ground-clearance 32 may be represented by an end-view profile of the undercarriage of the host-vehicle 12. For example, the host-vehicle 12 may be able to straddle an object with a greater peak height if the object 20 passes under the center of the host-vehicle 12 rather than off-center and near a tire. It is recognized that the object 20 does not actually pass under the host-vehicle 12, but rather the host-vehicle 12 passes over the object 20 when the host-vehicle 12 straddles the object 20. However, conceptually, the object 20 can be described as passing under the host-vehicle 12.

The object-detector 24 may also be particularly configured to indicate the width 34 of the object 20 approached by the host-vehicle 12. By way of a non-limiting example, the lidar may include a lateral array of laser emitters arranged across the width of the host-vehicle 12 so each of the emitters emits a laser-beam parallel to each other and aligned with the straight-ahead travel-direction of the host-vehicle 12. Each of the beams may be scanned vertically so the width 34 of the object 20 can be determined regardless of the height 30 and the distance to the object 20. However, this configuration is not a requirement as those in the art will recognize that data/images from various devices mounted elsewhere on the host-vehicle can be fused and analyzed using known geometry techniques that consider distance from the host-vehicle 12 to the object 20 to determine the width 34 of the object 20.

It may also be advantageous for the object-detector 24 to be configured to determine a length 38 of the object 20. Knowing the length 38 may be useful to provide a confidence level to the determination of the height 30 and the width 34. For example, if the object 20 is relatively long, more than two meters for example, the height 30 and/or the width 34 may change over the length 38 of the object 20. It is contemplated that certain configurations of the object-detector 24 may do well at detecting the height 30 and width 34 of the forward-face or leading-edge of the object 20 closest to the host-vehicle 12, but be unable to reliably detect the height 30 and/or width 34 trailing-edge of the object farthest from the host-vehicle 12. Accordingly, the controller 26 may limit the use of information from the object-detector 24 that is gathered from a distance that exceeds a detector-range 40. The value of the detector-range 40 may be determined empirically and/or analytically, and will likely be different for different configurations of the object-detector 24 and different models of the host-vehicle 12.

The length 38 may be determined using a camera, a lidar, a radar, or any combination thereof mounted at a relatively high location on the host-vehicle 12, on the roof of the host-vehicle 12 for example. Given an elevated perspective view, data from one or more of these devices can be fused and analyzed using known geometry techniques that consider distance from the host-vehicle 12 to the object 20 to determine the length 38 of the object 20.

Referring again to FIG. 2, if the height 30 and the width 34 of the object 20 are such the host-vehicle 12 is able to straddle 28 the object 20, then the controller 26 may elect to do so. That is, the controller 26 may steer the host-vehicle 12 to straddle 28 the object 20 when the height 30 of the object 20 is less than the ground-clearance 21 of the host-vehicle 12, and the width 34 of the object 20 is less than the track-width 36 of the host-vehicle. However, the controller 26 may elect to steer-around 42 if the length 38 of the object 20 puts the trailing edge of the object 20 past the detector-range 40. The controller 26 may also steer-around the object 20 when the height 30 of the object 20 is not less than the ground-clearance 21 of the host-vehicle 12 or the width 34 of the object 20 is not less than the track-width 36 of the host-vehicle.

FIG. 2 shows an approaching-vehicle 44 and road-markers 46 that will prevent, at least temporarily, the host-vehicle 12 being operated to steer-around 42 the object 20. Until the approaching-vehicle 44 passes, and no other vehicles are approaching, the controller 26 may be configured to stop 48 the host-vehicle 12 until the situation is such that the host-vehicle 12 can steer-around 42 the host-vehicle.

Accordingly, a steering-system (the system 10), a controller 26 for the system 10, and a method of operating the system 10 is provided. The system 10 provides the means for an automated vehicle to determine if an object 20 in the travel-path 22 of the host-vehicle 12 can either straddle 28, or steer-around 42 the object 20, or if the host-vehicle 12 must stop 48 and wait for an opportunity to steer-around 42 the host-vehicle 12.

While this invention has been described in terms of the preferred embodiments thereof, it is not intended to be so limited, but rather only to the extent set forth in the claims that follow.

We claim:

1. A steering-system for an automated vehicle, said system comprising:
   an object-detector that is configured to:
      detect a length and a height of an object approached by a host-vehicle;
      generate a confidence value of the height of the object based on the length of the object; and
      indicate the confidence value and the height of the object approached by the host-vehicle; and
   a controller in communication with the object-detector configured to:
      determine whether to steer the host-vehicle over the object based on the height of the object and the confidence value; and
      steer the host-vehicle according to the determining.

2. The steering-system in accordance with claim 1, wherein the object-detector comprises one or more of a camera, a lidar, a radar and an ultrasonic-transducer.

3. The steering-system in accordance with claim 1, wherein:
   the object-detector is further configured to determine that a trailing edge of the object is past a range of detection of the object-detector; and the controller is further configured to steer the host-vehicle around the object, when the object-detector determines that the trailing edge of the object is past the range of detection of the object-detector.

4. The steering-system in accordance with claim 1, wherein the object-detector is further configured to:
detect multiple heights for the object; and
indicate a tallest height of the multiple heights.

5. A steering-system for an automated vehicle, said system comprising:
an object-detector that is configured to:
detect a height of an object approached by a host-vehicle; and
indicate the height of the object approached by the host-vehicle; and
a controller in communication with the object-detector configured to:
receive information from the object-detector, the information including the height;
limit use of the information from the object-detector that is gathered from a distance that exceeds a detector-range of the object-detector; and
steer the host-vehicle based on the information from the object-detector.

6. The steering-system in accordance with claim 5, wherein the object-detector is further configured to:
detect multiple heights for the object; and
indicate a tallest height of the multiple heights.

7. The steering-system in accordance with claim 5, wherein:
the object-detector is further configured to determine that a trailing edge of the object is past a range of detection of the object-detector; and
the controller is further configured to steer the host-vehicle around the object, when the object-detector determines that the trailing edge of the object is past the range of detection of the object-detector.

8. A steering-system for an automated vehicle, said system comprising:
an object-detector that is configured to:
detect a length and a width of an object approached by a host-vehicle;
generate a confidence value of the width of the object based on the length of the object; and
indicate the confidence value and the width of the object approached by a host-vehicle; and
a controller in communication with the object-detector configured to:
determine whether to steer the host-vehicle over the object based on the width of the object and the confidence value; and
steer the host-vehicle according to the determining.

9. The steering-system in accordance with claim 8, wherein the object-detector is further configured to:
detect multiple heights for the object; and
indicate a tallest height of the multiple heights.

10. The steering-system in accordance with claim 8, wherein:
the object-detector is further configured to determine that a trailing edge of the object is past a range of detection of the object-detector; and
the controller is further configured to steer the host-vehicle around the object, when the object-detector determines that the trailing edge of the object is past the range of detection of the object-detector.

11. A method comprising:
detecting, using an object-detector, a length and a height of an object approached by a host-vehicle;
generating a confidence value of the height of the object based on the length of the object; and
indicating the confidence value and the height of the object approached by the host-vehicle;
determining whether to steer the host-vehicle over the object based on the height of the object and the confidence value; and
steering, according to the object-detector comprising one or more of a camera, LiDAR, or an ultrasonic transducer, the host-vehicle according to the determining.

12. The method in accordance with claim 11, wherein the object-detector comprises one or more of a camera, a lidar, a radar and an ultrasonic-transducer.

13. The method in accordance with claim 11, further comprising:
determining that a trailing edge of the object is past a range of detection of the object-detector; and
steering the host-vehicle around the object, when the object-detector determines that the trailing edge of the object is past the range of detection of the object-detector.

14. The method in accordance with claim 11, further comprising:
detecting multiple heights for the object; and
indicating a tallest height of the multiple heights.

15. A method comprising:
detecting, using an object detector, a height of an object approached by a host-vehicle;
indicating the height of the object approached by the host-vehicle;
receiving information from the object-detector, the information including the height;
limiting use of the information from the object-detector that is gathered from a distance that exceeds a detector-range of the object-detector; and
steering, according to the object-detector comprising one or more of a camera, LiDAR, or an ultrasonic transducer, the host-vehicle based on the information from the object-detector.

16. The method in accordance with claim 15, further comprising:
detecting multiple heights for the object; and
indicating a tallest height of the multiple heights.

17. The method in accordance with claim 15, further comprising:
determining that a trailing edge of the object is past a range of detection of the object-detector; and
steering the host-vehicle around the object, when the object-detector determines that the trailing edge of the object is past the range of detection of the object-detector.

18. A method comprising:
detecting, using an object-detector, a length and a width of an object approached by a host-vehicle;
generating a confidence value of the width of the object based on the length of the object;
indicating the confidence value and the width of the object approached by a host-vehicle;
determining whether to steer the host-vehicle over the object based on the width of the object and the confidence value; and
steering, according to the object-detector comprising one or more of a camera, LiDAR, or an ultrasonic transducer, the host-vehicle according to the determining.

19. The method in accordance with claim 18, further comprising:
  detecting multiple heights for the object; and
  indicating a tallest height of the multiple heights.

20. The method in accordance with claim 18, further comprising:
  determining that a trailing edge of the object is past a range of detection of the object-detector; and
  steering the host-vehicle around the object, when the object-detector determines that the trailing edge of the object is past the range of detection of the object-detector.

\* \* \* \* \*